United States Patent [19]

Robitschek et al.

[11] 3,966,658
[45] June 29, 1976

[54] LIQUID PHENOL-ALDEHYDE ADHESIVE FOR USE IN CURTAIN-COATING ADHESIVE APPLICATORS

[75] Inventors: Paul Robitschek, Eugene; Norman Andrew Chappelie, Springfield; John Wallace Lorimer, Eugene, all of Oreg.

[73] Assignee: Chembond Corporation, Springfield, Oreg.

[22] Filed: Aug. 26, 1974

[21] Appl. No.: 500,366

Related U.S. Application Data

[63] Continuation of Ser. No. 295,599, Oct. 6, 1972, abandoned.

[52] U.S. Cl.................................. 260/29.3; 260/7; 260/17.2; 260/38; 260/58; C08L/61/12
[51] Int. Cl.².................. C08L 61/10; C08L 61/14
[58] Field of Search.............................. 260/29.3

[56] References Cited
UNITED STATES PATENTS

| | | | |
|---|---|---|---|
| 2,106,180 | 1/1938 | Kreimeier | 260/632 |
| 2,250,445 | 7/1941 | Bruson et al | 260/617 |
| 2,997,447 | 8/1961 | Russell et al | 252/351 |
| 3,297,638 | 1/1967 | Beaulieu | 260/59 |

OTHER PUBLICATIONS
Air Products, & Chemical Technical Bulletin 5–3, Apr., 1969.

*Primary Examiner*—Howard E. Schain
*Attorney, Agent, or Firm*—Eugene D. Farley

[57] ABSTRACT

A liquid adhesive composition for use in adhesive applicators of the curtain-coating class, such as are used in coating plywood veneers in the manufacture of plywood, comprises: An aqueous, alkaline phenol-aldehyde resinous adhesive, a filler, and a minor proportion of 2,4,7,9-tetramethyl-5-decyne-4,7-diol, or of the ethylene glycol-,propylene glycol-,and butylene glycol-ethers thereof having from 1 to 10 mols of glycol per mol of diol. The diol or diol ether serves the function of improving the curtain-forming qualities of the adhesive composition. In particular, its inclusion in the composition insures curtain uniformity, i.e. the absence of curtain breaks and tears, and uniform spread on the substrate.

10 Claims, No Drawings

LIQUID PHENOL-ALDEHYDE ADHESIVE FOR USE IN CURTAIN-COATING ADHESIVE APPLICATORS

This is a continuation of application Ser. No. 295,599, filed Oct. 6, 1972, now abandoned.

This invention relates to liquid adhesives. In particular, it pertains to liquid phenol-aldehyde adhesives adapted for use in adhesive applicators of the curtain-coating class. The compositions are of special applicability in the coating with adhesives of wood veneers to be used in the manufacture of plywood. They are described herein with particular reference to this application, although no limitation thereby is intended.

The liquid phenol-aldehyde resinous adhesives are widely used in the plywood and other industries because of the high degree of strength and water resistance which their use imparts to the products in which they are contained. The phenol-formaldehyde resinous adhesives are of particular value because of their effectiveness, commercial availability and relatively low cost. These adhesives are sold commercially in the form of their water solutions containing from 3–10% of caustic soda or other alkali and having a total solids content of from about 40–50% by weight.

In the plywood manufacturing plant the resinous adhesives are compounded into plywood glues by the addition of suitable amounts of extenders such as ground corn cobs or ground bark fractions, and of thickeners such as wheat flour, blood or other protein and starch containing materials. Also added may be additional quantities of water and alkali, principally caustic soda or soda ash. The resulting adhesive compositions contain about 20–35% resin solids and have a pH of from about 9–13.5. A typical phenolic adhesive for use in the manufacture of plywood is prepared by mixing in sequences the following constituents:

| | Pounds |
|---|---|
| Water | 585 |
| Ground corn cob filler | 250 |
| Wheat flour thickener | 95 |
| 50% caustic soda | 105 |
| Soda ash | 46 |
| Liquid, alkaline, phenol-Formaldehyde resin containing 40–50% by weight solids | 1600 |

In their use, the liquid, phenol-aldehyde resinous adhesives conventionally have been applied to the wood veneers by means of the roll-type glue spreaders included in the classic plywood veneer lay-up line. In such lines the wood veneers are fed by hand between glue-coated rolls which transfer the glue to the veneers. Because of the large amount of manual labor involved, the trend lately has been toward the introduction and use of automated plywood veneer assembly lines in which roll-type glue spreaders cannot be used to best advantage. In their place, liquid adhesive applicators of the curtain-coating class preferably are used.

An adhesive applicator of the curtain-coating class, or "curtain-coater", simply considered, comprises a reservoir containing liquid adhesive, a circulating system which circulates the liquid adhesive to a curtain-coating head, a collection pan positioned a spaced vertical distance beneath the curtain-coating head, and a conduit conveying surplus unused adhesive from the collection pan back to the reservoir.

The curtain-coating head comprises in effect a trough having a longitudinal slot in the bottom. The trough is at least as wide as the work and is arranged transversely to the path of travel of the latter. It delivers the liquid adhesive either gravitationally or under pressure. Upon delivery, the adhesive forms a vertical sheet or curtain which hopefully is continuous and without breaks along its entire length.

The work is conveyed continuously through this curtain, whereupon its upper surface is coated with liquid adhesive in amounts determined by such factors as the width of the slot in the curtain-coating head, the pressure applied to the adhesive, and the lineal rate of travel of the work as it passes through the curtain. Any overflow of adhesive is caught in the collection pan, which is situated beneath the work; and returned to the reservoir.

When the conventional phenolic resin glue is applied in a curtain-coater, the application of the adhesive to the work tends to be non-uniform and the glued product accordingly defective. This undesirable result is attributable to two principal factors.

In the first place, when using conventional phenolic adhesives in curtain-coating apparatus, it is difficult to establish a uniform curtain and maintain it over long periods of continuous operation. The curtain tends to break. The breaks in turn cause discontinuities in the adhesive film applied to the surface of the work. This results in inadequate bonding.

In the second place, the surfaces of wood veneers invariably are characterized by the presence of spaced ridges. These are of sufficient height to be bridged over by a film of the conventional phenolic adhesives as the veneers pass through the curtain. After leaving the curtain, the bridging portion of the adhesive coalesces, leaving a bare, uncoated area. This also results in inadequate bonding.

It accordingly is the principal object of the present invention to provide a liquid, phenol-aldehyde composition designed for use particularly in curtain-coating apparatus and which when so used provides a smooth, break-free curtain which persists over long operating periods and which upon contacting the wood wets the wood surface readily and uniformly.

It is a further purpose of the present invention to provide an adhesive composition of the foregoing class which is readily compatible with the other constituents of the glue mix, which is non-staining, and which does not affect adversely the pot life of the adhesive mix in which it is incorporated.

Broadly stated, the foregoing and other objects of the invention are achieved by the provision of a liquid, alkaline, phenol-aldehyde resinous adhesive which contains as a curtain-improving additive a small but effective proportion of 2,4,7,9-tetramethyl-5-decyne-4,7-diol or of the ethylene glycol-, propylene glycol-, and butylene glycol-ethers thereof having from 1–10 mols of glycol per mol of diol.

Considering the compositions of the invention in greater detail:

As noted above, the adhesive compositions of the invention broadly comprise a liquid, alkaline phenol-aldehyde resin, water, a filler or extender, a thickening agent, and a novel curtain-improving additive.

The first named of the foregoing constituents broadly comprises any of the adhesive, water soluble alkaline resinous condensation products of a phenol and an aldehyde. They are commercially available as water solutions having a pH of about 9–13.5 and a total solids content of from 40–50%.

They are manufactured by the reaction in alkaline medium occurring between a selected phenol and a selected aldehyde. Typical of the phenols which may be employed are phenol itself, the cresols, the xylenols, and resorcinol. Typical of aldehydes which may be condensed with the phenols in the production of the hereindescribed resinous adhesives are formaldehyde itself, acetaldehyde, and furfural.

Typical condensation products of these starting materials which are useful for the present purpose comprise the resinous condensation products of phenol and formaldehyde, phenol and furfural, and resorcinol and formaldehyde.

In the present state of the art the phenol-formaldehyde resins are of primary importance for the present purposes. However, for certain applications they may be modified by the inclusion of a proportion of one or the other of the phenol-aldehyde resins, for example from 1–20% by weight of such a resin, based on the total resin solids content.

Fillers or extenders which are employed for the hereindescribed purpose are well known and serve the purpose of extending, or increasing the efficient use of, the adhesive use of the adhesive component of the mix. Typical of them are ground corn cobs, ground oat hulls, and ground fractions of bark or wood, etc.

The thickening agents employed in the compositions of my invention comprise the well known materials added to resinous plywood glues for the purpose of giving additional body to the glue. Typical of such agents are wheat flour and dried blood.

In addition to the foregoing, there may be employed additional caustic soda, soda ash or other alkaline materials as required to establish a desired pH. Rot proofing, mildew proofing, and fire preventive chemicals may also be included.

All of the foregoing constituents are conventionally used in phenol-aldehyde resinous adhesives, and in particular in phenol-aldehyde resinous plywood adhesives. The novel constituent of the hereindescribed compositions which distinguishes them from the resinous adhesive compositions of the prior art and which imparts to them the desired curtain-improving qualities, making them of particular value for use in curtain-coaters, is a selected acetylenic diol or certain of its ether derivatives.

The diol in question is 2,4,7,9-tetramethyl-5-decyne-4,7-diol. This has the following formula:

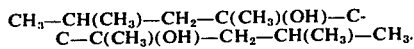

Its ether derivatives are ethylene glycol-, propylene glycol-, and butylene glycol- ethers having from 1–10 mols of glycol per mol of diol. These chemicals are available commercially as products of Air Products and Chemicals, Inc., the diol being sold under the trade name of SURFYNOL 104 and the ethylene glycol ether of the diol being sold under the trade name of SURFYNOL 440 (Air Products and Chemicals Technical Bulletin S-3 of April, 1969 and Technical Bulletin S-5 of June, 1967).

The other derivatives of the diol are manufactured by condensation of the diol with predetermined molar ratios of ethylene oxide, propylene oxide or butylene oxide. As is well known, such oxides condense with the hydroxyl groups of the diol to form ethers which also contain functional hydroxyl groups. These have the capacity of condensing further with additional alkylene oxide to form high molecular weight products.

When the diol is reacted with ethylene oxide, an ethoxide product is formed having the following general formula:

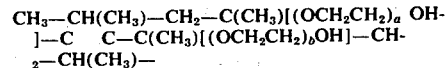

In the above formula, the subscript letters $a$ and $b$ indicate the number of mols of ethylene oxide which have condensed with the diol. For the purposes of the invention, the products formed in the case of this and the other named ethers are suitable wherein $a+b=$ from 1 to 10. The limiting factor is primarily the solubility of the ether product in water.

When one or a combination of the foregoing acetylenic diol and its ether derivatives is included in the phenol-aldehyde resinous adhesives of commerce it profoundly affects its curtain-forming qualities in that under the usual conditions of operation the curtain is rendered uniformly smooth and complete, being without breaks, over long periods of continuous operation. It also imparts to the resinous adhesives the ability to wet uniformly and completely the substrate surfaces to which it is applied. Both of these factors lead to the production of a glued product of uniformly high strength and high wood failure values.

A very small amount of the diol or its stated ether derivatives is effective in achieving this result. As little as 0.01% by weight, based on the weight of the liquid resin component of the adhesive, contributes a perceptible effect.

The upper limit of use of the curtain-improving additive is determined primarily by cost and mechanical considerations. The solubility of the additive in the aqueous resin adhesive solutions is limited. Any excess additive accordingly forms a separable phase which, in its least significant effect is wasteful, and in its most significant effect interferes mechanically with the normal application of the adhesive.

The solubility of the additive obviously is a function of its molecular weight. In general, however, it may be included in an amount from about 0.01% to about 5.0% by weight, based on the weight of the liquid phenol-aldehyde resin content of the adhesive composition. A preferred range of use is from 0.025% to 0.3% by weight. In the commercial application of an adhesive composition containing 2,4,7,9-tetramethyl-5-decyne-4,7-diol as the curtain-improving additive, a diol use of from 0.05 to 0.2% by weight is indicated by reason of economy and efficient use.

It is of particular interest that the 2,4,7,9-tetramethyl-5-decyne-4,7-diol and its stated ether derivatives are unique in their action in improving the curtain-forming properties of the phenol aldehyde resinous adhesives. In a comprehensive program involving a large number of surface acting materials including phenols, alcohols, polyols, ethers, esters, amines, various polymers, and even various other acetylenic diols, 2,4,7,9-tetramethyl-5-decyne-4,7-diol and its glycol ethers alone demonstrated significant and useful activity in improving the curtain-forming properties of the adhesive composition.

Various procedures may be employed in compositing the herein-described curtain-improving additives with the phenol aldehyde resinous adhesive mixtures.

In one of especial commercial significance, the additive is mixed with the phenol-aldehyde resin at the place of its manufacture preliminary to shipment to the place of compounding and using the glue. The solution of additive in resin thus per se is an article of commerce.

This may be accomplished by melting the diol or its glycol ether derivative and mixing it directly with the resin. This is accomplished easily, since the additive is of relatively low melting point. 2,4,7,9-tetramethyl-5-decyne-4,7-diol, for example, has a melting point of about 50°C.

On the other hand, the additive may be introduced in the form of a solution of the additive in an appropriate solvent. Such a solvent should, of course, be non-detrimental to, and non-interfering with, the other constituents of the adhesive composition. Suitable solvents comprise ethylene glycol and the alcohol solvents of intermediate molecular weight. Such alcohol solvents include, for example, the butanols, the pentanols, and the octanols. A sufficient amount of the solvent is employed to dissolve the diol or its glycol ether, there being no object in employing a large excess of solvent.

Alternatively, the curtain-improving additives of the invention may be added to the adhesive composition at the time of manufacture of the latter. The usual practice in compounding the adhesive compositions is to place a quantity of water in a commercial mixer, adding the various components stepwise with intermittent mixing until a uniform glue of the desired composition is obtained. The hereindescribed curtain-forming additives may be incorporated in the adhesive compositions manufactured by this procedure at any suitable stage of the mixing. They preferably are applied in liquid form, either in the molten condition or in solution, as above described.

After their formulation, the adhesive compositions may be applied in curtain-coating apparatus of conventional design without essential modification of apparatus or operating procedure. They do not affect the assembly time values of the glues in which they are contained, nor the strength of the final bond. In fact, as noted above, the strength of the glued product is materially improved by reason of the fact that the use of the additive causes the production of a smooth, uniform curtain having no breaks and persisting over long operating periods. It also causes uniform wetting of the substrate surface so that a uniform application of the glue is ensured.

The adhesive compositions of the invention and their manner of formulation is illustrated in the following examples:

EXAMPLE I

This example illustrates the effect on curtain-forming properties of the incorporation of the hereindescribed diol in a commercial phenol-formaldehyde resin.

A commercial liquid phenol-formaldehyde resin, (CERAC 312) containing 6.1% by weight sodium hydroxide and 40% by weight total solids, and having a T viscosity on the Gardner-Holdt scale, and a pH of 12.3, was compounded with 0.1% by weight of 2,4,7,9-tetramethyl-5-decyne-4,7-diol based on the weight of the liquid resin. The resulting mixture was stirred until a clear solution resulted. Its curtain-forming and veneer-wetting properies were tested by applying it in conventional manner to plywood veneers using a laboratory type curtain-coater having a pressure head developing 6–10 psi pressure. As a control, the procedure was repeated using straight resin (CERAC 312), without the addition of the diol.

The tested composition including the diol formed a curtain and wetted the veneer. The control composition containing no diol additive was not curtain-forming and had poor veneer-wetting properties.

EXAMPLE II

This example illustrates the application of the hereindescribed diol additive to the formulation of a phenol-formaldehyde resin plywood glue.

The glue was compounded from the same liquid phenol-formaldehyde resin (CERAC 312) employed in Example I.

First a control glue was prepared which contained no curtain-forming additive. It had the following composition, parts being expressed as parts by weight:

| | |
|---|---|
| Phenol-formaldehyde resin | 75.86 |
| Water | 11.49 |
| Ground corn cob filler | 5.75 |
| Wheat flour thickening agent | 4.60 |
| 50% caustic soda solution | 2.30 |

The foregoing ingredients were compounded in a mixer yielding a glue having a viscosity of 1600 centipoises when measured on a Brookfield viscometer at 25°C., at 20 r.p.m. spindle speed.

This glue has a solids content of 30.4% by weight. When used in a commercial pressure-type curtain-coater at a head pressure of 6–10 p.s.i., a breaking, unsatisfactory curtain was formed. Additionally, the glue did not wet the veneers satisfactorily.

Next a glue of the invention was prepared by adding to the foregoing plywood glue 0.1% by weight of 2,4,7,9-tetramethyl-5-decyne-4,7-diol, based on the weight of the phenol-formaldehyde liquid resin. The resulting compounded glue was tested in the same commercial coater. It was observed to form an excellent curtain and to wet the veneer substrate uniformly and effectively.

EXAMPLE III

This example illustrates the composition of the invention using varying amounts of the 2,4,7,9-tetramethyl-5-decyne-4,7-diol additive.

The procedure of Example II was repeated, using in a first instance 0.025% by weight of the diol and in a second instance 0.3% by weight thereof. In both instances curtain-forming and veneer-wetting properties were demonstrated, although in the second instance there was incipient separation of the acetylenic diol.

EXAMPLE IV

This example illustrates the composition of the invention used at high viscosity.

The procedure of Example II was followed, with the glue being mixed until a viscosity value of 8,250 centipoises was reached. The improved curtain-forming and wetting qualities related in Example II again were observed.

EXAMPLE V

This example illustrates the glue of the invention at a 25% resin solids content as opposed to the 30.4% resin solids content of Example II.

The procedure of Example II was repeated employing the following composition:

| | Parts by weight |
|---|---|
| Commercial phenol-formaldehyde resin | 57.2 |
| Water | 22.9 |
| Ground corn cob filler | 11.3 |
| Wheat flour thickener | 3.2 |
| 50% caustic | 4.3 |

The resin employed was CERAC 303, a commercial resin containing 6.1% by weight sodium hydroxide and 43% by weight total solids, and having a T viscosity (Gardner-Holdt) and a pH of 12.1.

To the foregoing mixture, 0.1% by weight (based on the weight of the liquid resin), of 2,4,7,9-tetramethyl-5-decyne-4,7-diol was added and mixed in. Upon applying the composition to plywood veneers in a commercial curtain-coater, the composition again displayed the noted superior curtain-forming and veneer-wetting properties.

EXAMPLE VI

This example illustrates an alternate method of manufacturing the hereindescribed curtain-coating, phenol-formaldehyde resinous composition, wherein the acetylenic diol additive is added to the phenol-formaldehyde resin before the latter is incorporated in the glue mix.

The procedure of Example II was repeated except that the phenol-formaldehyde resin was heated to a temperature of 83°C. and 0.1% by weight, based on the weight of the liquid resin, of 2,4,7,9-tetramethyl-5-decyne-4,7-diol mixed in. Since the melting point of the diol is 50°C., the mixing temperature was above the melting point of the latter and facilitated its incorporation into the resin.

Thereafter, the resin with its content of acetylenic diol was added to the other constituents of the glue mix in the manner recited in Example II, and with similar results.

EXAMPLE VII

This example illustrates the compositions of the invention employing in lieu of the 2,4,7,9-tetramethyl-5-decyne-4,7-diol the ethylene glycol ether thereof.

The procedure of Example II again was repeated, using in place of the 2,4,7,9-tetramethyl-5-decyne-4,7-diol the same weight percent of the ethylene glycol ether of 2,4,7,9-tetramethyl-5-decyne-4,7-diol having 3.5 mols of glycol per mol of diol. Upon testing the curtain-forming and veneer-wetting qualities of the resulting product, the same superior performances were noted.

In a manner similar to the foregoing, there are prepared compositions of the invention containing in lieu of the ethylene glycol ether of 2,4,7,9-tetramethyl-5-decyne-4,7-diol an equivalent amount of the propylene glycol- and butylene glycol- ethers thereof having from 1–10 mols of glycol per mol of diol; and in lieu of the phenol-formaldehyde resin an equivalent amount of resorcinol formaldehyde resin, cresol formaldehyde resin and phenol furfural resin.

EXAMPLE VIII

To illustrate the unique effect of the use of 2,4,7,9-tetramethyl-5-decyne-4,7-diol and its ethylene glycol, propylene glycol and butylene glycol ethers, there were prepared and tested a large number of compounds of different classes known to act in varying degree as wetting agents. The compositions were formulated and tested in the manner set forth in Example II, using the Example II test mixture with the substitution of the hereinbelow listed compounds for the 2,4,7,9-tetramethyl-5-decyne-4,7-diol of the latter example. The amounts and procedures were the same as in Example II, with the exception that the indicated amount of additive was employed, by weight, based on the weight of the liquid phenol-formaldehyde resin.

| | Additive | Amount Used |
|---|---|---|
| ALCOHOLS | | |
| | Isopropanol | 0.2 |
| | n-Amylalcohol | 0.2 |
| | n-Octanol | 0.2 |
| | Dimethyl Octanol | 0.2 |
| | Isononyl alcohol | 0.1 |
| | Decyl alcohol | 0.2 |
| | Dodecyl alcohol | 0.2 |
| | Diacetone alcohol | 0.2 |
| | Isostearyl alcohol | 0.2 |
| | Methyl pentynol | 0.2 |
| | Hexynol | 0.2 |
| | Dimethyl Hexynol | 0.2 |
| | Ethyl octynol | 0.2 |
| POLYOLS | | |
| | 1,2,6 Hexane Triol | 0.2 |
| | Dimethyl hexynediol | 0.2 |
| | Dimethyl Octynediol | 0.2 |
| | Dimethyl Hexanediol | 0.2 |
| ETHERS | | |
| | Polyoxyethylene (12) Tridecyl ether | 0.2 |
| | Polyoxyethylene (15) Tridecyl ether | 0.2 |
| | Polyoxyethylene (6) Tridecyl ether | 0.25 |
| ESTERS | | |
| | Sodium Dioctyl sulfosuccinate | 0.2 |
| | Sodium Heptadecyl sulfate | 0.2 |
| | Butyl Stearate | 0.2 |
| | Sorbitan monopalmitate | 0.2 |
| | Sorbitan monostearate | 0.2 |
| | Sorbitan monolaurate | 0.2 |
| MISCELLANEOUS | | |
| | N,N-Cetyl ethyl morpholinium sulfate | 0.2 |
| | Lecithin | 0.2 |
| | Methyl isobutyl ketone | 0.2 |
| | Vinsol resin | 0.2 |
| | Sodium 2-ethylhexyl-sulfate | 0.2 |
| | Carboxymethylcellulose | 0.2 |
| | 2 Ethyl hexoic acid | 0.2 |
| | Decanoic Acid (Capric) | 0.2 |
| | Octanoic Acid (Caprylic) | 0.2 |

Upon testing the curtain-forming and veneer-wetting properties of the resulting glue compositions, none of the above noted additives, even though they are known wetting agents, and even though some of them are acetylenic derivatives, significantly improved the curtain-forming and veneer-wetting properties of the compositions in which they were contained.

Having thus described my invention in preferred embodiments, I claim:

1. For use in adhesive applicators of the curtain-coating class, a liquid adhesive composition comprising:

a. a liquid, alkaline, phenol-aldehyde resinous adhesive, b. a filler material for phenol-aldehyde resinous adhesives,
c. water, and
d. as a curtain-improving additive, at least one member of the group consisting of 2,4,7,9-tetramethyl-5-decyne-4,7-diol and the ethylene glycol-, propylene glycol-, and butylene glycol-ethers thereof having from 1 to 10 moles of glycol per mole of diol,
e. the composition having a pH of from about 9 to about 13.5, a resin solids content of from about 10% to about 40% by weight, based on the total weight of the composition, and a curtain-improving additive content of at least 0.01% by weight, based on the weight of the liquid phenol-aldehyde resinous adhesive component of the composition.

2. The composition of claim 1 wherein the phenol-aldehyde resinous adhesive comprises a phenol-formaldehyde resinous adhesive.

3. The composition of claim 1 wherein the composition has a resin solids content of from about 20 to about 35% by weight.

4. The composition of claim 1 wherein the composition has a curtain-improving additive content of from about 0.01% to about 5.0%.

5. The composition of claim 1 wherein the composition has a curtain-improving addition content of from 0.05 to 0.2% by weight.

6. The composition of claim 1 wherein the curtain-improving additive is 2,4,7,9-tetramethyl-5-decyne-4,7-diol.

7. The composition of claim 1 wherein the curtain-improving additive is the ethylene glycol ether of 2,4,7,9-tetramethyl-5-decyne-4,7-diol.

8. The composition of claim 1 wherein the phenol aldehyde resinous adhesive is a phenol formaldehyde resinous adhesive, the curtain-improving additive is 2,4,7,9-tetramethyl-5-decyne-4,7-diol, the composition has a resin solids content of from about 20 to about 35% by weight and a curtain-improving additive content of from about 0.05 to 0.2% by weight.

9. The composition of claim 1 wherein the phenol aldehyde resinous adhesive is a phenol formaldehyde resinous adhesive, and the curtain-improving additive is the ethylene glycol ether of 2,4,7,9-tetramethyl-5-decyne-4,7-diol.

10. For use in the formulation of a liquid adhesive composition applicable in adhesive applicators of the curtain-coating class, a liquid, alkaline phenol-formaldehyde resinous adhesive containing from about 0.01% to about 5% by weight, based on the weight of the liquid resinous adhesive of a curtain-improving additive of the group consisting of 2,4,7,9-tetramethyl-5-decyne-4,7-diol and the ethylene glycol-, propylene glycol-, and butylene glycol-ethers thereof having from 1 to 10 moles of glycol per mole of diol.

* * * * *